UNITED STATES PATENT OFFICE.

JOHN G. GANSZ AND JACOB J. LAVO, OF ST. LOUIS, MISSOURI.

IMPROVED COMPOSITION FOR REMOVING INCRUSTATIONS FROM BOILERS.

Specification forming part of Letters Patent No. 50,237, dated October 3, 1865.

*To all whom it may concern:*

Be it known that we, JOHN G. GANSZ and JACOB J. LAVO, of the city and county of St. Louis, and State of Missouri, have invented a new Chemical Compound for Removing Incrustations from Boilers; and we do hereby declare that the following is a full, clear, and exact description thereof.

We take of chloride of iron, ten pounds; of chlorate of barium, five pounds; of sal ammoniac, one pound; of rectified sugar, four pounds; of concentrated lye, four pounds, and unite them by mixing in one mass.

When the compound thus prepared is well mixed it should be kept from the air, as it is exceedingly volatile. A small portion—say one pound of the mixture—should every morning be put into the cold-water reservoir or heater for every fifty barrels of water used in any steam-boiler. This quantity will be sufficient to remove all the old scales from the boiler and keep the boiler clean, thereby effecting an economy in fuel and increasing the safety of the boiler.

Having described our invention, what we claim, and desire to secure the use of by Letters Patent, is—

A chemical compound for removing incrustations on boilers, which compound is composed of the ingredients mentioned in the foregoing specification united or mixed together in the proportions specified, or their equivalents.

JACOB J. LAVO.
JOHN G. $\overset{\text{his}}{\times}$ GANSZ.
$\phantom{JOHN G.}$ mark Witnesses:
GEORGE P. HERTHEL, Jr.,
M. RANDOLPH.